United States Patent [19]
Matsui et al.

[11] Patent Number: 5,843,255
[45] Date of Patent: Dec. 1, 1998

[54] METHOD OF BONDING A MAGNETIC HEAD ELEMENT TO A SUPPORTING BEAM

[75] Inventors: Masaaki Matsui, 3-1 Kumada, Nagakute, Nagakute-cho, Aichi-gun, Aichi-ken, Japan; Seiichi Nagata, Nagoya, Japan

[73] Assignees: Daidotokushuko Kabushiki Kaisha; Masaaki Matsui, , both of Japan

[21] Appl. No.: 597,187

[22] Filed: Feb. 6, 1996

[30] Foreign Application Priority Data

Feb. 10, 1995 [JP] Japan .................................. 7-046477

[51] Int. Cl.$^6$ .................................................. B32B 31/16
[52] U.S. Cl. ...................... 156/73.1; 156/580.1; 264/445
[58] Field of Search .................... 156/73.1, 290, 156/291, 292, 308.4, 580.1, 580.2; 360/104, 125, 132, 133; 264/442, 443, 445

[56] References Cited

U.S. PATENT DOCUMENTS

| 5,223,063 | 6/1993 | Yamazaki et al. | 156/73.2 |
| 5,354,392 | 10/1994 | Santo et al. | 156/73.1 |
| 5,358,579 | 10/1994 | Tanabe | 156/73.1 |
| 5,487,802 | 1/1996 | Mizuta et al. | 156/73.1 |

FOREIGN PATENT DOCUMENTS

| 6150250 | 5/1994 | Japan . |
| 6150251 | 5/1994 | Japan . |

*Primary Examiner*—James Sells
*Attorney, Agent, or Firm*—William A. Drucker

[57] ABSTRACT

A connecting pad of a magnetic head element is bonded to a signal conductor of a supporting beam. As a result of the bonding, the magnetic head element is mechanically coupled to the supporting beam and the connecting pad is electrically connected to the signal conductor. Also an auxiliary pad of the magnetic head element is bonded to the signal conductor. This bonding improves the mechanical coupling strength of the magnetic head element to the supporting beam. When the magnetic head element is to be bonded to the supporting beam, one of the pads is bonded to the signal conductor, and thereafter the other pad is bonded to the signal conductor. During the process of the latter bonding, a groove which is previously disposed in the signal conductor blocks heat given for the bonding from being transmitted to the former bonding portion in which bonding has been already completed, thereby preventing the bonding of the former bonding portion from being broken.

5 Claims, 3 Drawing Sheets

METHOD OF BONDING A MAGNETIC HEAD ELEMENT TO A SUPPORTING BEAM

TECHNICAL FIELD

The invention relates to a method of bonding a magnetic head element to a supporting beam in a contact-type magnetic head during a process of producing the magnetic head.

BACKGROUND ART

A contact-type thin film magnetic head is used in the manner shown in FIG. 4A. Referring to FIG. 4A, 1 designates a magnetic disk, and 2 designates a supporting arm which supports a magnetic head and has a basal portion 2a connected to an actuator for moving the head. The reference numeral 3 designates the contact-type thin film magnetic head which is attached to the tip portion of the supporting arm 2, 4 designates a supporting beam in a magnetic head 3 and the beam is elastic and has a basal portion 4a attached to the supporting arm 2, 5 designates a contact-type thin film magnetic head element which is disposed at the tip portion of the supporting beam 4, and 6 designates a contact tip of the head element 5. The contact face 6a of the contact tip is caused to contact with the surface 1a of the magnetic disk 1 by the elasticity of the supporting beam 4 and performs recording and reproducing on the magnetic disk 1. For example, the magnetic head element 5 has a sectional structure shown in FIG. 4B. The reference numeral 7 designates the body made of an insulating material such as aluminum oxide, 8 designates a pole for performing recording and reproducing on a magnetic disk, 9 designates a return yoke, 10 designates a magnetic core, 11 designates a yoke, 12 designates a coil, and 13 designates a connecting pad for performing mechanical and electrical connections to the supporting beam 4. The connecting pad is mechanically fixed to the body 7 and electrically connected to the coil 12 (for example, Japanese Published Unexamined Patent Application No. 6-274829).

When the magnetic head 3 is to be produced, the magnetic head element 5 is bonded to the supporting beam 4. The bonding is conducted by soldering the connecting pad 13 of the magnetic head element 5 to a signal conductor disposed in the supporting beam 4 (for example, Japanese Published Unexamined Patent Application No. 6-150250).

In the above-mentioned method, the mechanical coupling of the magnetic head element 5 to the supporting beam 4, and the electrical connection of the connecting pad 13 of the magnetic head element 5 to the signal conductor of the supporting beam 4 are conducted at one time, and hence the working efficiency is excellent.

In the bonding by means of only the connecting pad, however, there is a limit in bonding force. To comply with this, it is desired that the mechanical coupling strength of the magnetic head element to the supporting beam is enhanced with the result that the stability of the state of attaching the magnetic head element to the supporting beam is further improved.

SUMMARY OF THE INVENTION

The method of bonding a magnetic head element to a supporting beam according to the invention is provided in order to satisfy the demand.

It is an object of the invention, as a result of bonding a connecting pad of a magnetic head element to a signal conductor of a supporting beam, to enable both mechanical coupling of the magnetic head element to the supporting beam and an electrical connection of the connecting pad of the magnetic head element to the signal conductor of the supporting beam to be conducted at one time.

It is another object of the invention to, in addition to the bonding of the connecting pad to the signal conductor, allow an auxiliary pad to be bonded to the signal conductor, whereby the mechanical coupling strength of the magnetic head element to the supporting beam is enhanced so that the stability of the state of attaching the magnetic head element to the supporting beam is improved.

It is a further object of the invention to, even in the case where a connecting pad and an auxiliary pad are separately bonded to a signal conductor, enable a work of bonding a portion in which bonding is lately done, to be conducted under the state where heat of the portion to be bonded is prevented from affecting another bonding portion in which bonding has been already completed.

The method of bonding a magnetic head element to a supporting beam according to the invention is a method in which a connecting pad for mechanical and electrical connections and an auxiliary pad for increasing a mechanical coupling strength in said magnetic head element are bonded to a signal conductor in said supporting beam, said method comprising the steps of: previously forming a groove for blocking heat transmission between bonding portions in said signal conductor to which portions said pads are to be bonded, respectively, said groove being disposed between said bonding portions; contacting one of said pads with one of said bonding portions and heating the contact portion, thereby bonding the one pad with the one bonding portion; and contacting the other pad with the other bonding portion and heating the contact portion, thereby bonding the other pad with the other bonding portion under a state where heat transmission from the other bonding portion to the one bonding portion is blocked by said groove.

According to the invention, when a magnetic head element is to be bonded to a supporting beam, a connecting pad is bonded to a signal conductor. Consequently, a mechanical coupling of the magnetic head element to the supporting beam, and an electrical connection of the connecting pad to the signal conductor can be simultaneously conducted so that the working efficiency is high.

In addition to the connecting pad, furthermore, an auxiliary pad also is bonded to the signal conductor. Therefore, the mechanical coupling strength of the magnetic head element to the supporting beam is improved. As a result, an effect that the stability of the state of attaching the magnetic head element to the supporting beam is very enhanced is attained.

In the invention, moreover, two pads, i.e., the connecting pad and the auxiliary pad are bonded to the signal conductor as described above. In order to obtain a large bonding strength in each bonding portion, it is preferable to sufficiently heat the contact portion between each of the pads and the respective bonding portion of the signal conductor. In this case, when the heating is sufficiently done for a long period, its heat is transmitted to another bonding portion in which bonding has been already completed, thereby breaking the bonding of the other bonding portion and the respective pad. By contrast, in the invention, a groove which is disposed between a bonding portion and another bonding portion blocks the transmission of heat. As a result, even when the heating is sufficiently done in a portion where the bonding is lately conducted, its heat is blocked from being transmitted to another portion in which bonding has been already completed, thereby preventing the bonding in the other portion from being broken. This enables a large bonding strength to be obtained by sufficient heating. Furthermore, a bonding portion is prevented from erroneously broken, so that the bonding operation correctly proceeds.

Other objects and advantages of the invention will become apparent during the following discussion of the accompanying drawings.

DESCRIPTION OF THE PREFERRED EMBODIMENT

Figure 1:
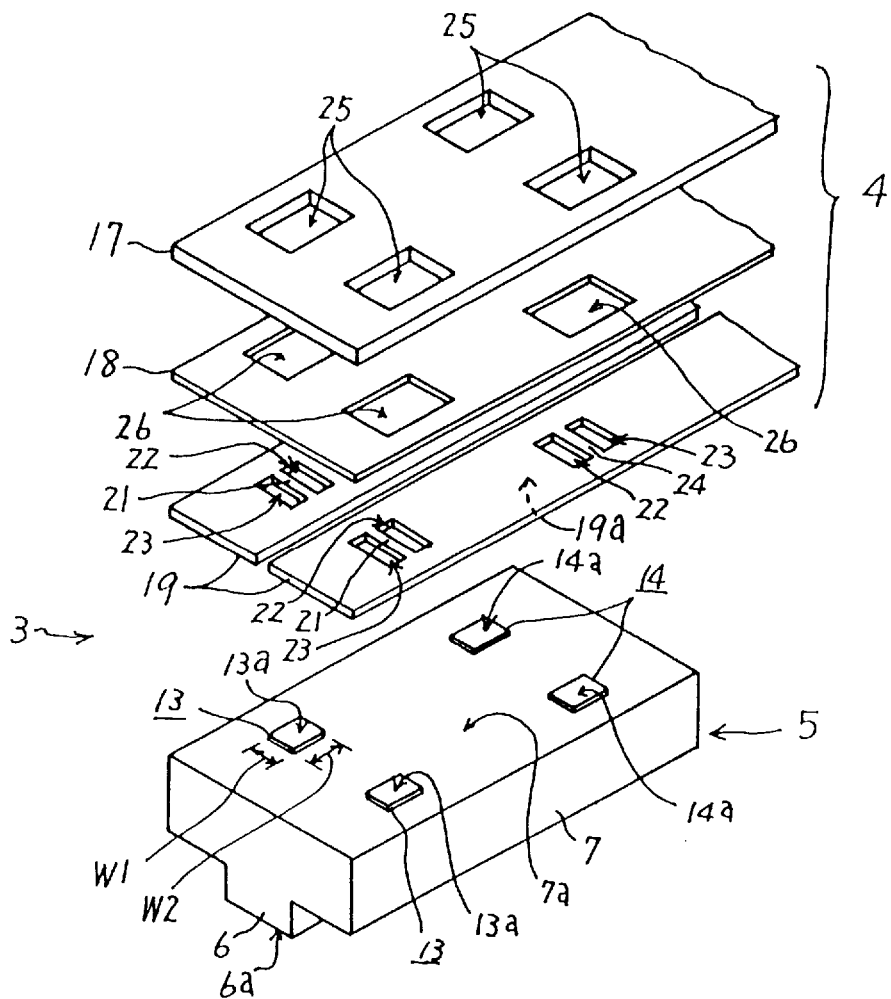
FIG. 1 is an exploded perspective view showing relationships between a supporting beam and a contact-type magnetic head element.
Figure 2:
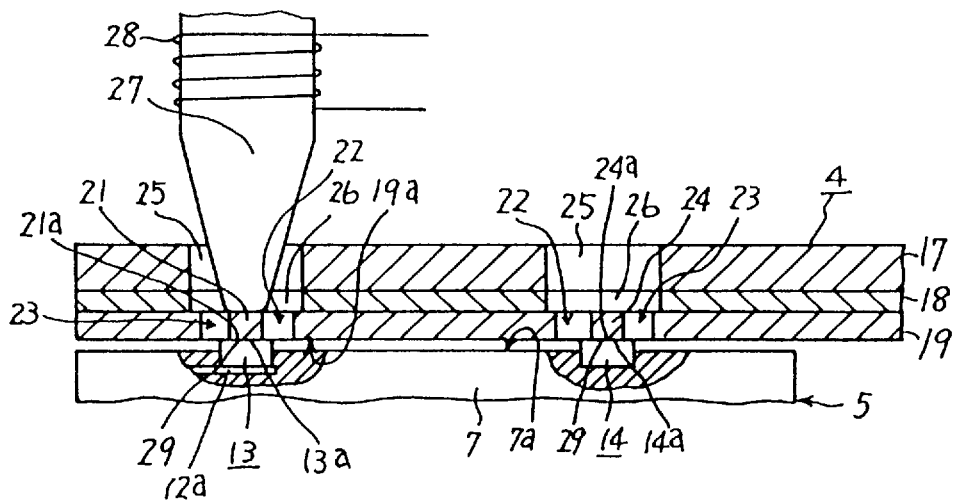
FIG. 2 is a section view showing a state where a connecting pad is to be bonded to a signal conductor.
Figure 3:
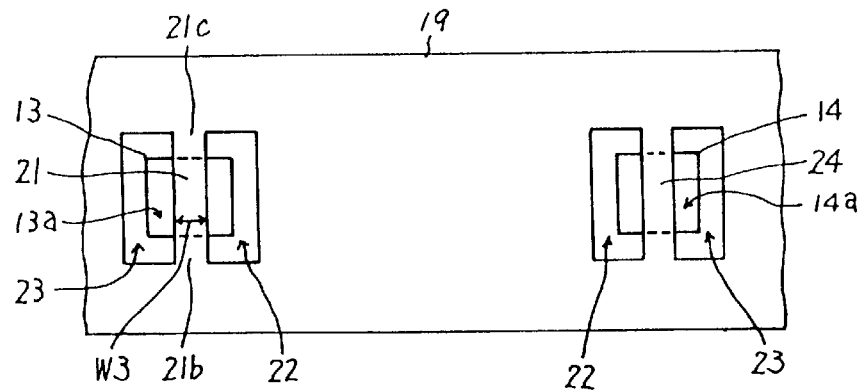
FIG. 3 is a plan view showing relationships between a signal conductor and a connecting pad and an auxiliary pad (or showing a state where a base and an insulating layer are removed away)

Hereinafter, FIGS. 1 to 3 showing an embodiment of the invention will be described. In the figures, the same reference numerals as those of FIG. 4 designate functionally equivalent components and their description may be duplicated. Therefore, the duplicated description is omitted. Referring to the figures, connecting pads 13 of the head element 5 are used for mechanically coupling the head element 5 to the supporting beam 4 and electrically connecting a signal circuit of the head element 5 to the signal conductor of the supporting beam 4. For example, both the length and width W1 and W2 of the connecting pads 13 have a dimension of about 75 $\mu$m. The upper face 13a of each connecting pad 13 serves as a bonding face in the bonding which will be described later. In order to allow the upper faces 13a to surely contact with the signal conductors of the supporting beam 4, the upper faces 13a are slightly protruded (for example, by about 0.5 $\mu$m) with respect to the upper face 7a of the body 7 of the head element 5. The upper faces 13a are configured by a material which is hardly oxidized, such as gold so that the surface control is facilitated (the formation of an oxide film is suppressed). For example, the upper face 13a configured by gold may be realized by forming the whole of the connecting pad 13 by gold. Alternatively, the upper face may be provided with gold by plating or forming a thin film on the connecting pad 13 made of another material. The reference numeral 12a in FIG. 2 designates a signal circuit connected to the connecting pads 13. Terminals of a coil are shown as an example of the circuit. The reference numeral 14 designates auxiliary pads which are disposed in an auxiliary manner in order to further strengthen the mechanical coupling of the head element 5 to the supporting beam 4. The auxiliary pads 14 are fixed to the body 7, but, unlike the connecting pads 13, are not electrically connected to the inside of the head element 5. For example, the auxiliary pads 14 are made by the same material as the connecting pads 13 and have the same size as the connecting pads. When the connecting pads 13 are formed by thin film forming means, for example, the auxiliary pads 14 may be formed together with the connecting pads.

The supporting beam 4 has a structure in which three layers: a base 17 configured by, for example, a stainless steel spring plate; an insulating layer 18; and signal conductors 19 made of, for example, copper are integrally stacked. The base 17 and the signal conductors 19 contribute to the resilience of the supporting beam 4. The reference numeral 19a designates a face of each signal conductor 19 on the side where the signal conductor is to be bonded to the pads 13 and 14. Each face 19a is formed by gold with the same object as that of the upper faces 13a of the connecting pads 13. The reference numeral 21 designates bonding portions to which the connecting pads 13 of the magnetic head 5 are to be bonded, respectively. In order to realize a signal transmission between the connecting pads 13 and the signal conductors 19, each bonding portion 21 is disposed in the respective signal conductor 19. As illustrated, each bonding portion 21 is formed so as to have a small width so that the heat capacity of the bonding portion itself is reduced. Grooves 22 and 23 which are respectively formed on the both sides of each bonding portion are used for blocking heat transmission from each bonding portion 21 to the area surrounding the bonding portion. The reference numeral 24 designates bonding portions to which the auxiliary pads 14 are to be bonded, respectively. In the same manner as the bonding portions 21, the bonding portions 24 are formed so as to have a small width and grooves 22 and 23 are respectively formed on the both sides of each bonding portion 24. Among the grooves 22 and 23, particularly, the grooves positioned between the bonding portions 21 and 24 are disposed also with a further object of blocking heat transmission between the bonding portions 21 and 24. The portions 25 in the base 17 are through holes which are formed so as to allow the tip end of a presser for the bonding operation which will be described later, to pressingly contact with the bonding portions 21 and 24 without touching the base 17. In order to suppress the lowering in strength of the base 17, the through holes 25 are preferably formed so as to have a size which is as small as possible but in the range where the presser is prevented from contacting with the base. The reference numeral 26 designates through holes which are formed in the insulating layer 18 with the same object as those of the through holes 25.

Next, the operation of bonding the head element 5 to the supporting beam 4 will be described. At first, the supporting beam 4 and the head element 5 are supported by respective jigs. The jigs are then operated so that, as shown in FIG. 2, the bonding faces 21a and 24a of the bonding portions 21 and 24 of the signal conductors 19 contact in an overlapping manner with the bonding faces 13a and 14a of the connecting pads 13 and the auxiliary pads 14 of the head element 5. In this contact, the bonding faces 13a and 14a are caused to surely contact with the faces 21a and 24a because the bonding faces 13a and 14a are protruded. As shown in FIG. 3, the connecting pads 13 and the auxiliary pads 14 can be observed through the grooves 22 and 23. Therefore, the operation of positioning the bonding portions 21 and 24 with respect to the connecting pads 13 and the auxiliary pads 14 can be facilitated. As shown in FIG. 2, the tip of a thermal-compression bonding presser 27 is then pressed against one of the bonding portions 21 via the through holes 25 and 26 and heat generated by a heater 28 is supplied to the bonding portion 21. The thermal-compression bonding presser 27 is used for applying a pressing force to an area where the bonding is to be conducted and transmitting heat for the bonding, generated by the heater 28, to the area. The pressing is conducted by applying a predetermined contact pressure. The pressing and heating of the presser 27 supply a pressure and heat to the contact portion 29 between the faces 21a and 13a so that the contact portion is subjected to the thermal-compression bonding, with the result that the bonding portion 21 and the connecting pad 13 are integrally bonded to each other. This bonding causes the bonding portion 21 and the connecting pad 13 to be mechanically coupled to each other. As a result, a state in which the magnetic head element 5 is mechanically fixed to the supporting beam 4 is obtained. This bonding causes also the bonding portion 21 and connecting pad 13 to be electrically connected each other so that a state in which the signal circuit of the magnetic head element 5 is electrically coupled to the signal conductor 19. For example, the tip end face of the thermal-compression bonding presser 27 has a rectangular shape in which one edge is equal to or shorter than about 100 μm. Alternatively, the end face may have a circular shape the diameter of which is equal to or shorter than about 100 μm. In order to ensure an adequate bonding state, preferably, the period when the pressing of the thermal-compression bonding presser 27 is done is previously determined in accordance with results of tests which are conducted with using samples of the supporting beam 4 and the head element 5.

In the thermal-compression bonding of the bonding portion 21, a phenomenon that the temperature of the bonding portion 21 is rapidly raised occurs because the portion 21 has a small width so as to have a reduced heat capacity. Furthermore, the presence of the grooves 22 and 23 restricts the path of heat transmission to the signal conductor 19 surrounding the bonding portion 21, to end portions 21b and 21c of the bonding portion 21. Therefore, heat of the bonding portion 21 hardly enters the surrounding signal conductor 19. Also this phenomenon enhances the rapid temperature rise of the bonding portion 21. These phenomena enable the bonding operation to be rapidly completed. Such rapid completion of the bonding operation reduces the possibility that the heat is transmitted to the interior of the head element 5, thereby preventing the properties of the head element from being impaired. Moreover, the reduced amount of heat-transmitted to the surrounding signal conductor 19 inhibits the signal conductor 19 from being raised in temperature and hence prevents the spring properties of the conductor from being degraded.

When the above-mentioned bonding between the bonding portion 21 and the connecting pad 13 is ended, the thermal-compression bonding presser 27 is then pressed against one of the bonding portions 24 and the bonding between the bonding portion 24 and one of the auxiliary pads 14 is conducted in the same manner as that for the bonding portion 21. It is a matter of course that also the bonding of the bonding portion 24 can attain the same effects as those of the bonding of the bonding portion 21. In addition, the bonding can attain a further effect that the grooves 22 and 23 block the heat of the bonding portion 24 from being transmitted to the bonding portion 21 via the signal conductor 19 surrounding the bonding portion. Particularly, the groove 22 blocks the heat from being directly transmitted from the bonding portion 24 to the bonding portion 21. Consequently, an accident such as that the temperature of the bonding portion 21 in which the bonding has been already completed is raised and the bonding is broken does not occur at all. As a result of the bonding between the bonding portion 24 and the auxiliary pad 14, the state of mechanically coupling the magnetic head element 5 to the supporting beam 4 becomes very strong.

Figure 4A:
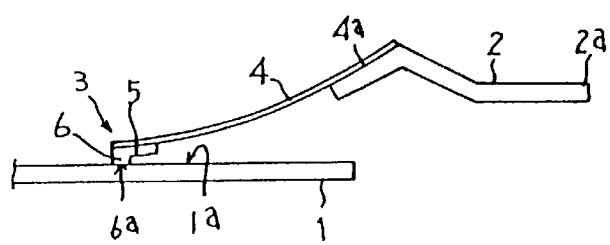
FIG. 4A is a partial view showing a use state of a contact-type thin film magnetic head.
Figure 4B:
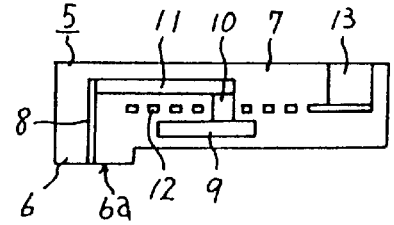
FIG. 4B is a longitudinal section view of the magnetic head element.
Figure 5:
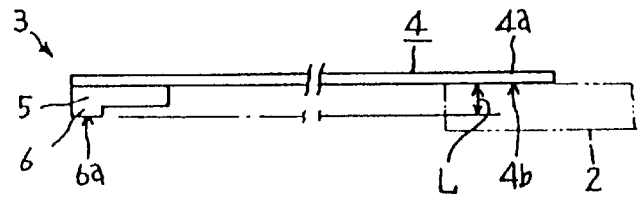
FIG. 5 is an enlarged view of the contact-type thin film magnetic head.

When the operations of bonding all the connecting pads 13 and the auxiliary pads 14 are ended, the supporting beam 4 and the head element 5 are detached from the jigs, thereby completing the bonding of the head element 5 to the supporting beam 4. In the bonding described above, the bonding portions 21 and 24 are directly (without interposition) bonded with the connecting pads 13 and the auxiliary pads 14. In the completed head 3 which is obtained after the bonding, therefore, the dimension L (see FIG. 5) between the reference face 4b and the contact face 6a is highly accurate. The reference face 4b is a face for conducting attachment of the basal portion 4a of the supporting beam 4 to the supporting arm 2. The dimension L is a dimension obtained when the supporting beam 4 is in the free state as shown in FIG. 5. The high accuracy of the dimension L allows the contact face 6a to contact with the surface 1a of a disk with a predetermined contact pressure in a use state such as shown in FIG. 4.

Either of the bonding portions 21 and 24 may be first subjected to the bonding operation. The upper faces 13a and 14a of the connecting pads 13 and the auxiliary pads 14 of the head element 5 may be configured so as to be equal in level to or slightly lower than the upper face 7a of the body 7. In this case, the faces 21a and 24a of the bonding portions 21 and 24 of the signal conductor 19 which respectively oppose the upper faces may be formed so as to be protruded, thereby enabling the faces 21a and 24a and the faces 13a and 14a to contact with each other. The width W3 of each of the bonding portions 21 and 24 may be greater than the dimension in the same direction of the connecting pads 13 and the auxiliary pads 14.

Alternatively, the aforementioned bonding may be conducted in the following manner in order that an adverse effect due to heat on the signal conductors and the head element is reduced and the bonding is further rapidly conducted. In place of the thermal-compression bonding presser 27, an ultrasonic presser is pressed against each bonding portion in the same manner as the presser 27. An ultrasonic presser is a part of an ultrasonic machine which is used for transmitting ultrasonic vibration generated by an ultrasonic transducer to a workpiece. Ultrasonic wave energy is applied from the ultrasonic presser to the contact face 29. The bonding may be conducted by this method. The bonding may be conducted by so-called ultrasonic bonding means. In the case of the ultrasonic bonding, the faces 21a and 13a of the contact portion 29 are caused to diffuse into each other by the applied ultrasonic wave energy. When the application of the ultrasonic wave from the ultrasonic presser is then halted, the diffusion is stopped. This stop of the diffusion causes the contact portion 29 to which the ultrasonic wave energy has been applied, to instantaneously solidify, thereby realizing the bonding of the bonding portion 21 and the connecting pad 13. In this case, the diffusion occurs in a very restricted area, or only in the contact portion 29. Even when a small amount of ultrasonic wave energy is given, therefore, gold in the faces 21a and 13a of the contact portion can surely diffuse, with the result that the bonding can be surely performed. Since the bonding is done by applying ultrasonic wave energy, the generation of heat is restricted only to the contact portion 29 so that the portions of the signal conductor 19 other than the contact portion 29 and the interior of the head element 5 other than the contact portion 29 are hardly raised in temperature. Consequently, these properties of the components are prevented from being impaired. Since the contact portion 29 is caused to diffuse by locally applying ultrasonic wave energy to only the contact portion 29 as described above, the diffusion can be immediately stopped by halting the application of the ultrasonic wave. This can attain an effect that the bonding operation can be conducted very rapidly so as to improve the bonding efficiency.

Figure 6:
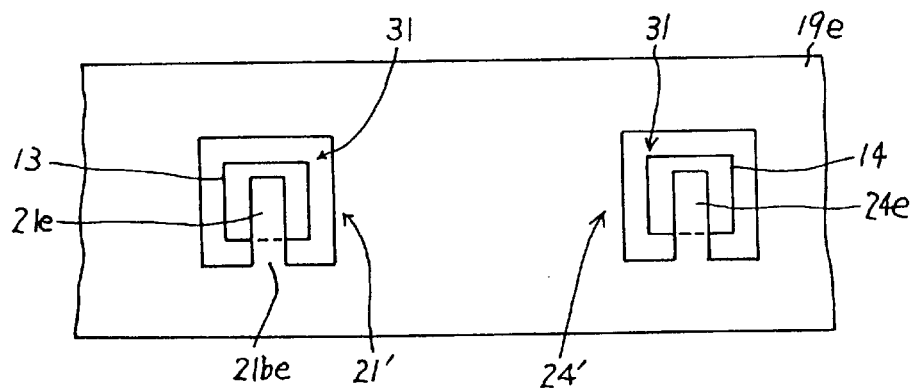
FIG. 6 is a plan view showing another example of a shape of a groove for blocking heat transmission.

FIG. 6 shows another example of a shape of the groove for blocking heat transmission in a signal conductor. Grooves 31 for blocking heat transmission are formed around bonding portions 21e and 24e or in the three sides of each bonding portion including the side 21' or 24' on the side of the other bonding portion, respectively. When the grooves 31 are formed into such a shape, heat transmission from the bonding portions 21e and 24e to the surrounding signal conductor 19e can be further reduced. As a result, the above-mentioned rapidity of the bonding operation and reduction of the adverse effect on the surrounding can be further enhanced. The components which may be functionally identical or equivalent to those shown in the previous figures and description of which may be duplicated are designated by the same reference numerals as those used in the figures and affixed by letter "e", and their duplicated description is omitted. (Similarly, also such components shown in the succeeding figures are designated by the same reference numerals affixed by letter "f" or "g" and their duplicated description is omitted.)

Figure 7:
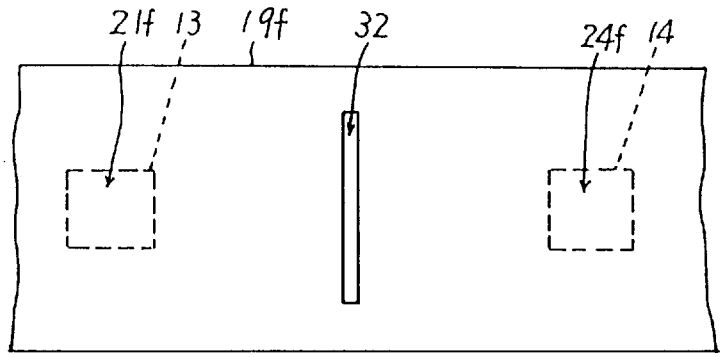
FIG. 7 is a plan view showing a further example of a shape of the groove for blocking heat transmission.

FIG. 7 shows a further example of a shape of the groove for blocking heat transmission between bonding portions 21f and 24f in a signal conductor 19f. A sole groove 32 for blocking heat transmission is laterally formed between the bonding portions 21f and 24f. Also in this configuration, the groove 32 blocks heat applied in the bonding of one of the bonding portions (e.g., the bonding portion 24f) from being linearly transmitted to the other bonding portion 21f. Consequently, heat must be transmitted to the other bonding portion while detouring the groove 32, whereby heat transmission to the other bonding portion is suppressed.

Figure 8:
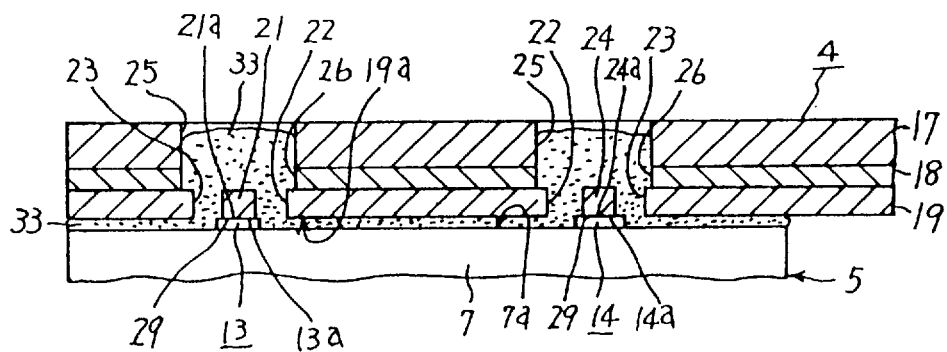
FIG. 8 is a longitudinal section view showing a bonding state in which an adhesive agent is additionally used.

FIG. 8 shows another embodiment in which the bonding of the magnetic head element 5 to the supporting beam 4 is realized by other means. In addition to the bonding by means of the bonding portions 21 and 24, the bonding of the magnetic head element 5 to the supporting beam 4 is further done by means of an adhesive agent 33 in order to further strengthen the bonding of the head element 5 to the supporting beam 4. The adhesive agent 33 makes adhesion of an overlapped area between the supporting beam 4 and the magnetic head element 5, for example, the lower face of the supporting beam 4 (in the embodiment, the lower face 19a of the signal conductor 19) and the upper face 7a of the body 7. The adhering by means of the adhesive agent 33 is conducted after the aforementioned bonding operation of the bonding portions 21 and 24. The adhesive agent 33 can be filled into the space between the upper and lower faces 7a and 19a while, for example, the through holes 25 and 26 are used as filling holes. This filling causes the upper and lower faces 19a and 7a to adhere to each other by means of the adhesive agent 33 so that the bonding of the head element 5 to the supporting beam 4 becomes very strong. Preferably, an agent which is excellent in permeability and electrical insulation property may be used as the adhesive agent.

Figure 9:
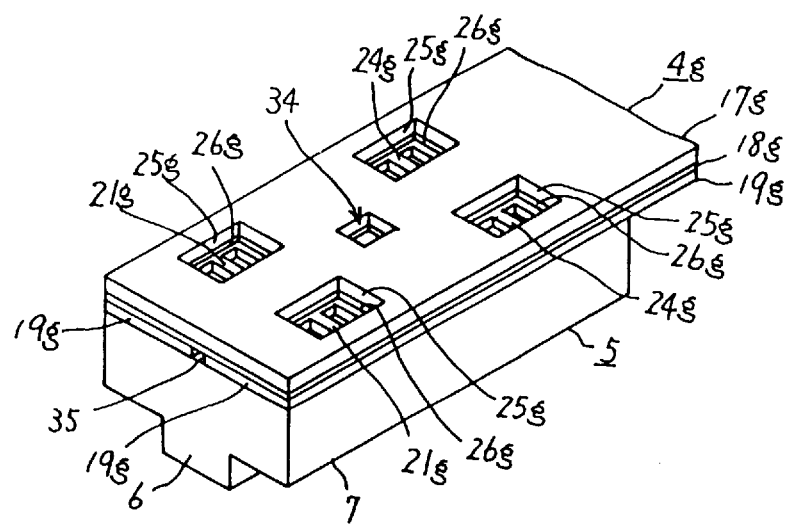
FIG. 9 is a perspective view showing an example of a supporting beam which is provided with a filling hole for the adhesive agent.

FIG. 9 shows an example in which a supporting beam 4g is configured in a different manner. A hole 34 for filling the adhesive agent is disposed in an area where the supporting beam 4g overlaps with the head element 5. The filling hole 34 is formed so as to communicate with a gap 35 between a pair of signal conductors 19g so that the adhesive agent surely flows into the space between the lower face of the signal conductor 19g and the upper face of the body 7. Consequently, the adhesive agent filled through the filling hole 34 can be impregnated into the whole space between the lower face of the signal conductor 19g and the upper face of the body 7, whereby the adhering can be ensured.

As many apparently widely different embodiments of this invention may be made without departing from the spirit and scope thereof, it is to be understood that the invention is not limited to the specific embodiments thereof except as defined in the appended claims.

What is claimed is:

1. A method for bonding a magnetic head element to a supporting beam in which a connecting pad for mechanical and electrical connections and an auxiliary pad for increasing mechanical coupling strength in said magnetic head element are bonded to a signal conductor in said supporting beam, said method comprising the steps of:

(a) providing said signal conductor;

(b) providing a connecting pad and an auxiliary pad on said signal conductor, said connecting pad and said auxiliary pad being spaced from each other and disposed on the same surface of said signal conductor, (c) providing a pair of grooves in said signal conductor for blocking heat transmission between each bonding portions in said signal conductor to which said connecting pad and said auxiliary pad are to be bonded on a pair of opposing sides of each of said pads, one of said pair of grooves being disposed between said connecting pad and said auxiliary pad to minimize the transfer of heat along said signal conductor;

(d) contacting said connecting pad with said signal conductor between a said pair of grooves;

(e) bonding said connecting pad to said signal conductor;

(f) contacting said auxiliary pad with said signal conductor between a further said grooves; and (g) bonding said auxiliary pad to said signal conductor, thereby bonding the other pad with the other bonding portion wherein heat transmission from the other bonding portion to the one bond portion is blocked by said groove.

2. A method of bonding a magnetic head element to a supporting beam according to claim 1, wherein said heating is conducted by applying ultrasonic wave energy.

3. A method of bonding a magnetic head element to a supporting beam according to claim 1, wherein said groove surrounds three sides of each of said pads including a side opposing a side of the other pad, and, wherein bonding is conducted wherein heat given to a said pad is blocked from being transmitted to said signal conductor surrounding said pad by said groove.

4. A method of bonding a magnetic head element to a supporting beam according to claim 1, wherein, after bonding of said other pad is completed, an area where said supporting beam overlaps with said magnetic head element is subjected to adhering by means of an adhesive agent.

5. A method of bonding a magnetic head element to a supporting beam according to claim 4, wherein said adhesive agent is filled through a filling hole in said supporting beam, said filling hole being disposed in the area where said supporting beam overlaps with said magnetic head element.

\* \* \* \* \*